US009338824B2

(12) United States Patent
Chiang et al.

(10) Patent No.: US 9,338,824 B2
(45) Date of Patent: May 10, 2016

(54) MEDIATION OF INFORMATION CARRIED VIA A COMMON PUBLIC RADIO INTERFACE

(71) Applicants: Verizon Patent and Licensing Inc., Basking Ridge, NJ (US); Cellco Partnership, Basking Ridge, NJ (US)

(72) Inventors: David Chiang, Fremont, CA (US); Arda Aksu, Martinez, CA (US); Thomas H. Tan, San Jose, CA (US); Donna L. Polehn, Kirkland, WA (US); Deepak Kakadia, Antioch, CA (US); Mingxing S. Li, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 216 days.

(21) Appl. No.: 14/171,264

(22) Filed: Feb. 3, 2014

(65) Prior Publication Data

US 2015/0223060 A1   Aug. 6, 2015

(51) Int. Cl.
*H04W 92/12* (2009.01)
*H04W 12/02* (2009.01)
*H04W 88/08* (2009.01)

(52) U.S. Cl.
CPC .............. *H04W 92/12* (2013.01); *H04W 12/02* (2013.01); *H04W 88/085* (2013.01)

(58) Field of Classification Search
CPC ... H04W 88/00; H04W 88/08; H04W 88/085; H04W 88/10; H04W 88/12; H04W 92/00; H04W 92/04; H04W 92/12; H04W 92/14; H04W 92/20; H04W 92/22; H04W 92/24; H04L 29/02; H04L 29/06; H04L 29/0604; H04L 29/06061; H04L 29/06068

See application file for complete search history.

(56) References Cited

U.S. PATENT DOCUMENTS

| 7,650,415 | B1 * | 1/2010 | Peterson | H04L 65/104 370/401 |
| 7,716,467 | B1 * | 5/2010 | Deffet | H04L 63/0471 713/153 |
| 8,018,910 | B2 * | 9/2011 | Jiang | H04W 88/10 370/342 |
| 8,275,418 | B2 * | 9/2012 | Yu | H04W 88/10 455/552.1 |
| 2005/0005022 | A1 * | 1/2005 | Taylor | H04L 67/2823 709/236 |
| 2005/0105552 | A1 * | 5/2005 | Osterling | H04L 69/18 370/466 |

(Continued)

OTHER PUBLICATIONS

Adams, Jim, "Altera Releasees CPRI v4.1 IP Core for Wireless Basestation and Remote Radio Head Design" [Online], Aug. 3, 2009, [Retrieved: Sep. 16, 2015], www.altera.com, Retrieved from: <https://www.altera.com/about/news_room/releases/_2009/products/nr-cpri.html>.*

(Continued)

*Primary Examiner* — Eric W Shepperd

(57) ABSTRACT

A device may receive first common public radio interface (CPRI) information associated with a first CPRI format. The device may determine a translation key associated with the first CPRI format. The translation key may include information associated with translating the first CPRI information to a second CPRI format. The second CPRI format may be different from the first CPRI format. The device may generate second CPRI information based on processing the first CPRI information with the translation key. The second CPRI information may be associated with the second CPRI format. The device may provide the second CPRI information associated with the second CPRI format.

20 Claims, 11 Drawing Sheets

(56) References Cited

U.S. PATENT DOCUMENTS

| | | | | |
|---|---|---|---|---|
| 2007/0116046 | A1* | 5/2007 | Liu | H04J 3/1617 370/466 |
| 2007/0283001 | A1* | 12/2007 | Spiess | H04L 12/2602 709/224 |
| 2008/0089689 | A1* | 4/2008 | Sakama | H04W 88/085 398/115 |
| 2009/0180423 | A1* | 7/2009 | Kroener | H04W 88/085 370/328 |
| 2009/0319773 | A1* | 12/2009 | Frenkel | G06F 21/50 713/153 |
| 2010/0067426 | A1* | 3/2010 | Voschina | H04W 88/08 370/313 |
| 2010/0118751 | A1* | 5/2010 | Sugiyama | H04B 1/406 370/310 |
| 2010/0120538 | A1* | 5/2010 | DeWitt | G07F 17/32 463/42 |
| 2011/0032910 | A1* | 2/2011 | Aarflot | H04J 3/0682 370/335 |
| 2012/0057572 | A1* | 3/2012 | Evans | H04W 88/085 370/338 |
| 2012/0307713 | A1* | 12/2012 | Watanabe | H04W 88/12 370/315 |
| 2012/0311426 | A1* | 12/2012 | Desai | G06F 17/2705 715/227 |
| 2013/0003658 | A1* | 1/2013 | Stewart | H04B 7/022 370/328 |
| 2013/0100948 | A1* | 4/2013 | Irvine | H04J 3/0632 370/350 |
| 2013/0250865 | A1* | 9/2013 | Ryan | H04W 88/085 370/329 |
| 2013/0290022 | A1* | 10/2013 | Shah | G06Q 10/101 705/3 |
| 2014/0171063 | A1* | 6/2014 | Mori | H04W 52/20 455/424 |
| 2014/0355991 | A1* | 12/2014 | Cameirao | H04B 10/2575 398/79 |
| 2015/0249549 | A1* | 9/2015 | Martinotti | H04L 49/555 370/242 |

OTHER PUBLICATIONS

Wikipedia, "C-RAN", http://en.wikipedia.org/wiki/C-RAN, Jan. 1, 2014, 6 pages.

Wikipedia, "Common Public Radio Interface", http://en.wikipedia.org/wiki/Common_Public_Radio_Interface, Oct. 31, 2013, 1 page.

Wikipedia, "Remote radio head", http://en.wikipedia.org/wiki/Remote_radio_head, May 8, 2013, 2 pages.

BLI, "CPRI basics: Common Public Radio Interface" http://www.mrdata.se/wrapper/CPRI%20basics_PA5.pdf, Jun. 23, 2011, 17 pages.

CPRI, "Specification Overview", http://www.cpri.info/spec.html, Oct. 19, 2003, 3 pages.

CPRI, "A Successful Industry Cooperation", http://www.cpri.info/index.html, May 22, 2010, 2 pages.

* cited by examiner

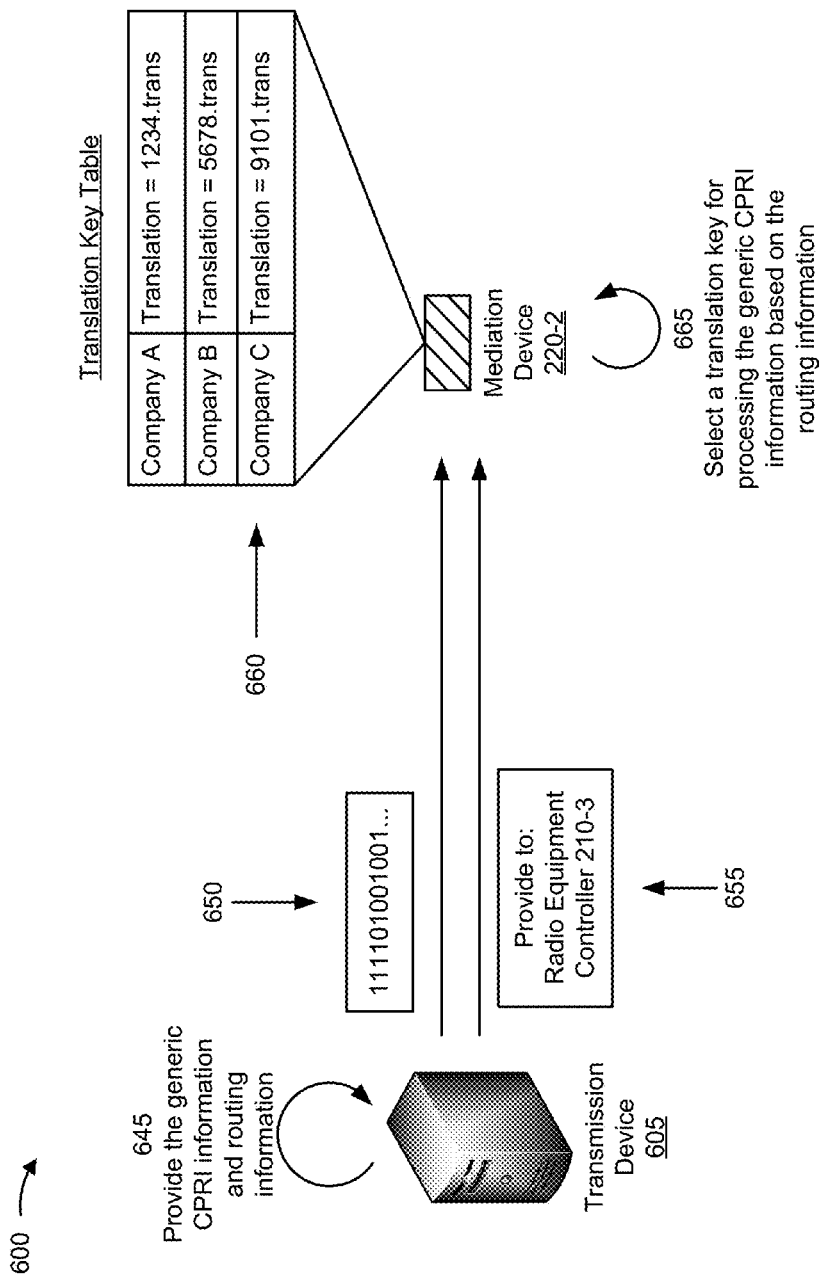

MEDIATION OF INFORMATION CARRIED VIA A COMMON PUBLIC RADIO INTERFACE

BACKGROUND

A common public radio interface (CPRI) may be utilized for transmission of radio communication information between a radio equipment device and a radio equipment controller. One or more characteristics of the information encoded on the CPRI interface may be proprietary to a vendor associated with the radio equipment device and/or a vendor associated with the radio equipment controller.

BRIEF DESCRIPTION OF THE DRAWINGS

FIGS. 6A-6D are diagrams of another example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A radio equipment device associated with a first vendor may receive a transmission from a mobile device via a network. The radio equipment device may generate CPRI information based on the transmission from the mobile device, and may provide the CPRI information to a radio equipment controller associated with a second vendor for reconstruction and/or processing. However, the CPRI information may be encoded in a particular format (e.g., according to a particular ordering, a particular formula, a particular encapsulation, a particular syntax, etc.) uninterpretable by the radio equipment controller. Moreover, utilizing a radio equipment device associated with a first vendor and a radio equipment controller associated with a second vendor may involve expensive and/or time-intensive interoperability testing. Implementations described herein may facilitate communication between a radio equipment device and a radio equipment controller by processing first CPRI information associated with a particular proprietary CPRI format to generate second CPRI information associated with a generic CPRI format.

Figure 1:
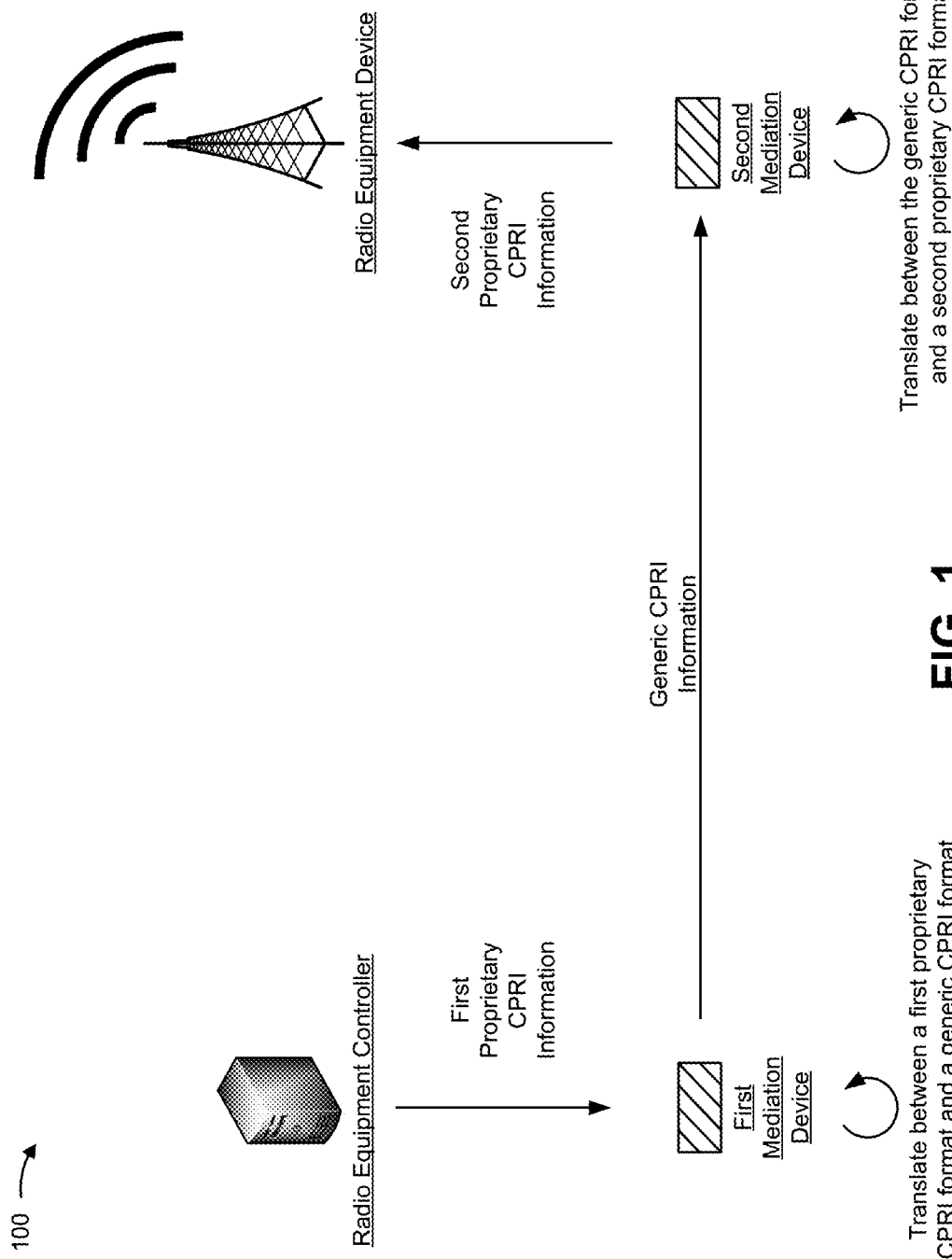
FIG. 1 is a diagram of an overview of an example implementation described herein.

FIG. 1 is a diagram of an overview of an example implementation 100 described herein. Example implementation 100 may include a radio equipment controller, a first mediation device, a second mediation device, and a radio equipment device. As shown in FIG. 1, the radio equipment controller may generate first proprietary CPRI information encapsulating radio communication information (e.g., based on a first proprietary algorithm), and may provide the first proprietary CPRI information (e.g., a bit stream representing a waveform) to the first mediation device. Proprietary CPRI information may refer to encoded information (e.g., radio communication information) that is associated with a particular proprietary CPRI interface format (e.g., a format that is associated with a particular radio equipment controller, a particular radio equipment device, a particular vendor associated with the particular radio equipment controller, the particular radio equipment device, etc., or the like). For example, the first proprietary CPRI information may be interpretable by the radio equipment controller (e.g., associated with a first vendor), and may be uninterpretable by the radio equipment device (e.g., associated with a second vendor).

The first mediation device may receive the first proprietary CPRI information. The first mediation device may access a translation key, such as a hardware translation key, a software translation key, or the like. The first mediation device may translate between a format associated with the first proprietary CPRI information and a format associated with generic CPRI information utilizing the translation key. Generic CPRI information may refer to encoded information associated with a generic CPRI format (e.g., a format that is not associated with a particular radio equipment controller, a particular radio equipment device, a particular vendor, or the like). For example, the generic CPRI information may be interpretable by the first mediation device, and may be interpretable by the second mediation device. The first mediation device may provide the generic CPRI information to the second mediation device (e.g. via a network, such as a fiber-optic network, a free-space optical network, or the like).

The second mediation device may receive the generic CPRI information, and may select another translation key. The second mediation device may translate between the format associated with the generic CPRI information and a format associated with second proprietary CPRI information (e.g., CPRI information that is encoded based on a format associated with the radio equipment device) utilizing the other translation key. The second mediation device may provide the second proprietary CPRI information to the radio equipment device. The radio equipment device may process the second proprietary CPRI information to determine radio communication information, and may provide the radio communication information to a mobile device (e.g., via a network, such as a code division multiple access (CDMA) network, a long term evolution (LTE) network, etc.). Radio communication information may refer to information associated with a radio frequency waveform transmitting information over a network (e.g., the CDMA network, the LTE network, etc.), information associated with user plane data, information associated with control and management plane transport mechanisms, information associated with synchronization, or the like.

In another example, the radio equipment device may provide first proprietary CPRI information to the first mediation device based on receiving radio communication information. The first mediation device may process the first proprietary CPRI information to generate generic CPRI information, and may provide the generic CPRI information to the second mediation device. The second mediation device may receive the generic CPRI information, and may process the generic CPRI information to generate second proprietary CPRI information. The second mediation device may provide the second proprietary CPRI information to the radio equipment controller. The radio equipment controller may receive the second proprietary CPRI information, and may process the second proprietary CPRI information for further transmission (e.g., via a network, such as an intranet, the Internet, or the like).

Figure 2:
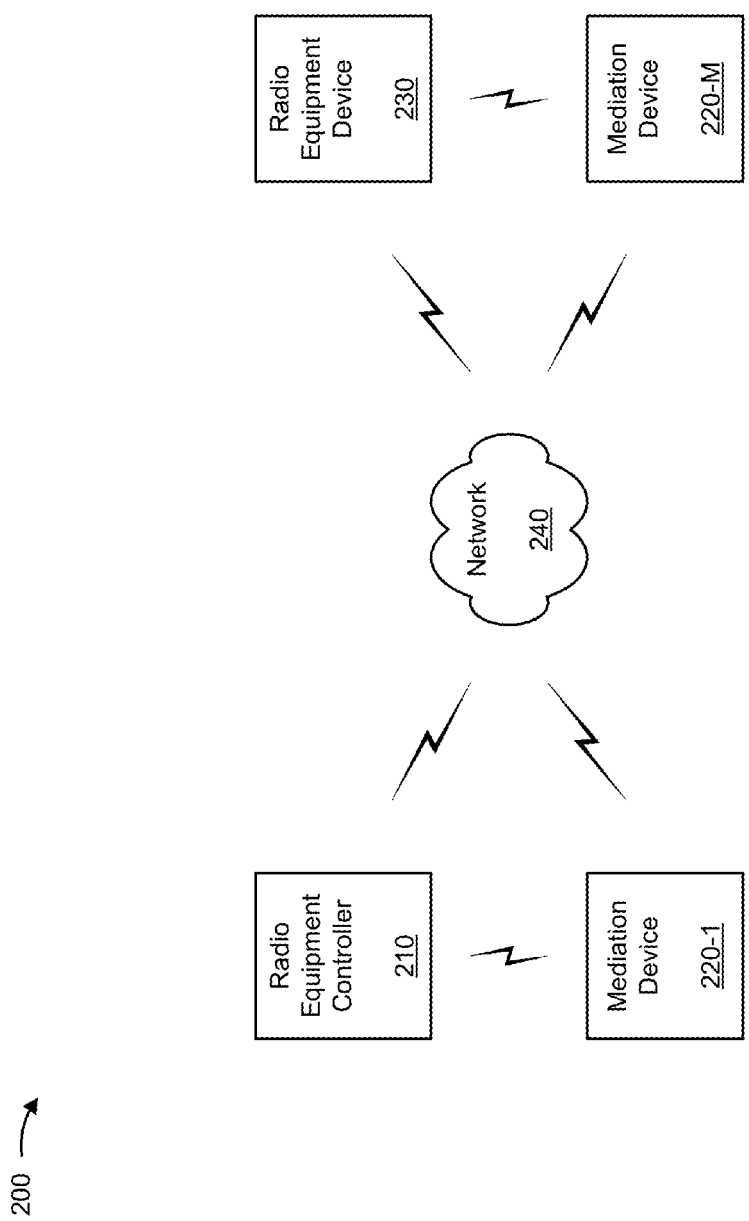
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include radio equipment controller 210, mediation devices 220-1 to 220-M (M≥1) (hereinafter referred to collectively as "mediation devices 220," and individually as "mediation device 220"), radio equipment device 230, and network 240. Devices of environment 200 may interconnect via wired connections, wireless connections, or a combination of wired and wireless connections.

Radio equipment controller 210 may include one or more devices capable of receiving, generating, processing, storing, and/or providing information associated with a mobile communication. For example, radio equipment controller 210 may include a base station, a baseband unit (BBU) (e.g., an LTE BBU, etc.), a radio equipment control (REC), a radio unit (e.g., a radio data encoding unit, a radio data decoding unit, etc.), a wideband CDMA (W-CDMA) digital unit, a server, or the like. In some implementations, radio equipment controller 210 may receive CPRI information (e.g., encapsulating information associated with a mobile communication), and may process the CPRI information to determine the information associated with the mobile communication (e.g., radio communication information). In some implementations, radio equipment controller 210 may be configured to utilize a proprietary CPRI information format (e.g., a CPRI information format associated with a particular encoding, a particular encryption, a particular set of header information, etc.), and may be configured to translate between the proprietary CPRI information and radio communication information. In some implementations, multiple radio equipment controllers 210 may be consolidated into a processing center (e.g., a base band hotel, a cloud-radio access network, a centralized-radio access network, etc.), and may receive CPRI information via a transmission device (e.g., a head unit, a router, a gateway, a switch, a hub, or the like). In some implementations, radio equipment controller 210 may be associated with a particular radio equipment device 230. Additionally, or alternatively, radio equipment controller 210 may be associated with multiple radio equipment devices 230 (e.g., via a multicast connection, a set of unicast connections, etc.) In some implementations, radio equipment controller 210 may communicate with one or more other radio equipment controllers 210 (e.g., via network 240).

Mediation device 220 may include one or more devices capable of receiving, generating, processing, storing, and/or providing CPRI information. For example, mediation device 220 may include a translation device, a dongle device, a network tap device, etc. that facilitates translation from a first CPRI information format to a second CPRI information format. In some implementations, mediation device 220 may include a translation key (e.g., an encryption key associated with translation between a proprietary CPRI information format and a generic CPRI information format, an encryption key associated with translation between a first proprietary CPRI information format and a second proprietary CPRI information format, etc.), such as a hardware encryption key, a software encryption key, or the like. In some implementations, a first mediation device 220 may communicate with a second mediation device 220 (e.g., via network 240). In some implementations, mediation device 220 may process CPRI information to determine a routing tag associated with a recipient, such as radio equipment controller 210, radio equipment device 230, or the like, and/or to determine a particular network path (e.g., associated with network 240) for providing the CPRI information to the recipient.

Radio equipment device 230 may include one or more devices capable of receiving, generating, processing, storing, and/or providing information associated with a mobile communication. For example, radio equipment device 230 may include an antenna, a remote radio head (RRH), radio equipment (RE), a radio frequency (RF) transceiver, an analog-to-digital converter, a digital-to-analog converter, or the like. In some implementations, radio equipment device 230 may receive (e.g., via network 240) radio communication information (e.g., a mobile communication associated with a radio frequency waveform transmission) from a mobile device, and may generate CPRI information (e.g., proprietary CPRI information) based on the radio communication information. Additionally, or alternatively, radio equipment device 230 may generate radio communication information based on CPRI information, and may provide the radio communication information to a particular mobile device (e.g., via network 240).

Network 240 may include one or more wired and/or wireless networks. For example, network 240 may include a fiber-optic network, a free space optical network, a microwave network (e.g., an E-band microwave network, etc.), a cellular network (e.g., an LTE network, a CDMA network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, and/or a combination of these or other types of networks. In some implementations, network 240 may utilize a non-point-to-point architecture, such as a mesh architecture, an ad hoc architecture, or the like.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while radio equipment controller 210 and mediation device 220 are shown as separate devices, radio equipment controller 210 and mediation device 220 may be implemented in a single device or in a single collection of devices. Additionally, one or more of the devices of environment 200 may perform one or more functions described as being performed by another one or more devices of environment 200.

Figure 3:
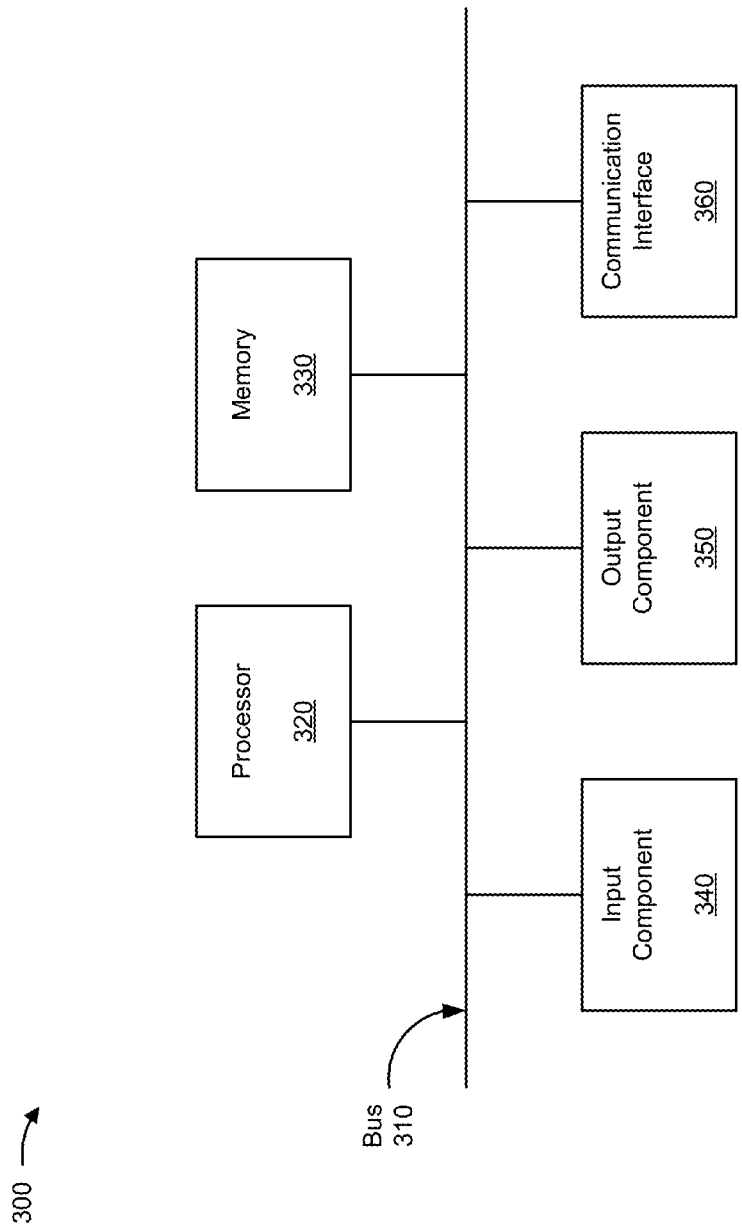
FIG. 3 is a diagram of example components of one or more devices of FIG. 2.

FIG. 3 is a diagram of example components of a device 300. Device 300 may correspond to radio equipment controller 210, mediation device 220, and/or radio equipment device 230. In some implementations, each of radio equipment controller 210, mediation device 220, and/or radio equipment device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
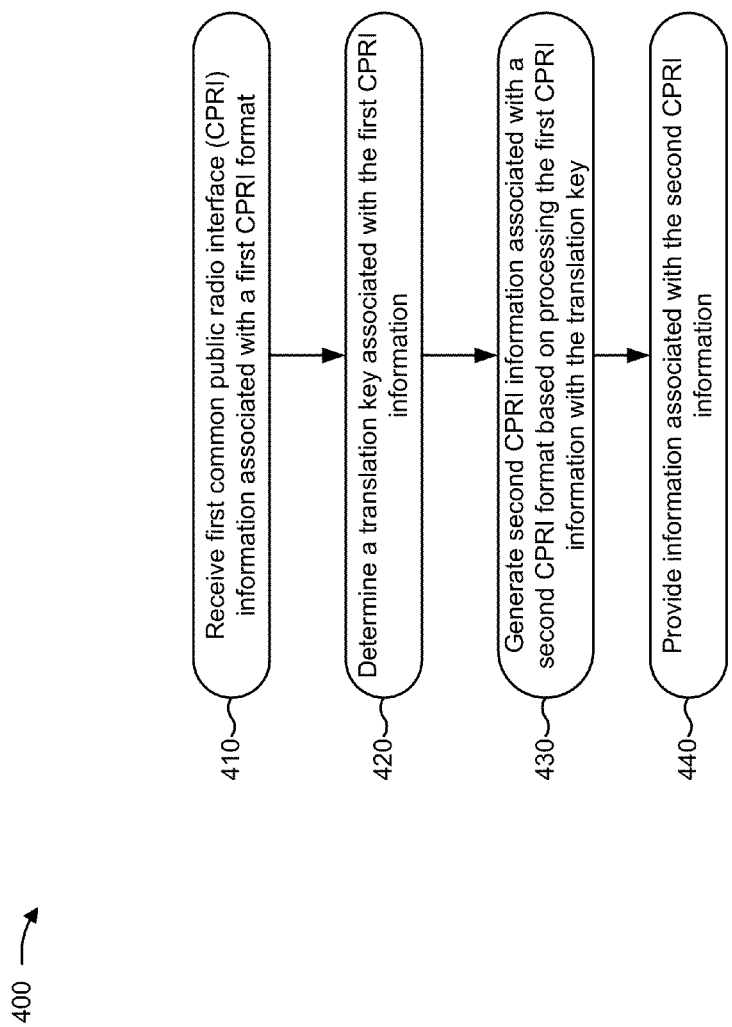
FIG. 4 is a flow chart of an example process for processing first CPRI information associated with a first CPRI format to generate second CPRI information associated with a second CPRI format.

FIG. 4 is a flow chart of an example process for processing first CPRI information associated with a first CPRI format to generate second CPRI information associated with a second CPRI format. In some implementations, one or more process blocks of FIG. 4 may be performed by mediation device 220. Additionally, or alternatively, one or more process blocks of FIG. 4 may be performed by another device or a group of devices separate from or including mediation device 220, such as radio equipment controller 210 and/or radio equipment device 230.

As shown in FIG. 4, process 400 may include receiving first common public radio interface (CPRI) information associated with a first CPRI format (block 410). For example, mediation device 220 may receive the first CPRI information from radio equipment controller 210, radio equipment device 230, another mediation device 220, a transmission device (e.g., a router, a gateway, a hub, etc.), or the like. CPRI information may refer to encoded information (e.g., utilizing a particular format, formula, ordering, encapsulation, syntax, etc.) associated with providing (e.g., via a fiber-optic connection, a free-space optical connection, etc.) radio communication information (e.g., a mobile communication associated with a radio frequency waveform, user plane data, control and management plane transport mechanism information, synchronization information, etc.). The CPRI information may include packets of information describing a phase and/or an amplitude of the waveform associated with the mobile communication. For example, the CPRI information may include a bit stream (e.g., associated with a particular waveform) based on radio data received via an antenna (e.g., associated with radio equipment device 230).

Mediation device 220 may receive proprietary CPRI information when receiving the first CPRI information associated with the first CPRI format, in some implementations. For example, mediation device 220 may receive the proprietary CPRI information from radio equipment controller 210, radio equipment device 230, or the like. Proprietary CPRI information may refer to CPRI information that is generated based on one or more techniques associated with a particular vendor (e.g., that may be associated with radio equipment controller 210, radio equipment device 230, etc.), a particular format (e.g., that may be associated with the particular vendor), or the like. For example, the proprietary CPRI information may be generated according to a proprietary technique associated with a first vendor of radio equipment controller 210, and may be uninterpretable by radio equipment device 230 when radio equipment device 230 is associated with a second vendor. Additionally, or alternatively, the proprietary CPRI information may be of a format interpretable by a first radio equipment device 230 associated with the first vendor, and may not be interpretable by a second radio equipment device 230 associated with the first vendor.

Mediation device 220 may receive generic CPRI information when receiving the first CPRI information associated with the first CPRI format, in some implementations. For example, mediation device 220 may receive the generic CPRI information from another mediation device 220. Generic CPRI information may refer to CPRI information that is not generated by one or more proprietary techniques associated with radio equipment controller 210, radio equipment device 230, a particular vendor (e.g., that is associated with radio equipment controller 210, radio equipment device 230, etc.), or the like. For example, the generic CPRI information may be generated according to a technique that is interpretable by multiple mediation devices 220. In some implementations, the generic CPRI information, received by mediation device 220, may be encrypted, compressed, or the like.

Mediation device 220 may receive a threshold quantity of information when receiving the first CPRI information, in some implementations. For example, the first CPRI information may include a particular quantity of bits that are associated with an amplitude and/or a phase of a waveform. In this case, a threshold quantity of bits may be associated with characterizing a particular amplitude and/or a particular phase. Additionally, or alternatively, the threshold quantity of bits may be associated with characterizing multiple amplitudes and/or multiple phases.

Mediation device 220 may receive information associated with the first CPRI information that includes translation information, in some implementations. For example, mediation device 220 may receive translation information identifying a format associated with the first CPRI information (e.g., a generic format, a proprietary format, etc.), an origin and/or a destination associated with the first CPRI information (e.g., a particular radio equipment controller 210, a particular radio equipment device 230, etc.), a particular vendor associated with the origin and/or the destination of the first CPRI information (e.g., the origin and/or the destination that is associated with radio equipment controller 210, radio equipment device 230, etc.), or the like.

As further shown in FIG. 4, process 400 may include determining a translation key associated with the first CPRI information (block 420). For example, mediation device 220 may determine the translation key associated with processing the first CPRI information to generate second CPRI information. A translation key may refer to information associated with translating from a first particular CPRI format to a second particular CPRI format. For example, mediation device 220 may utilize a hardware translation key, such as a removable hardware encryption key, a permanent hardware encryption key, or the like. Additionally, or alternatively, mediation device 220 may utilize a software translation key, such as a software encryption key, a static key, a non-static key, or the like. In some implementations, mediation device 220 may access a data structure storing one or more translation keys to determine the particular translation key associated with the first CPRI information.

Mediation device 220 may determine the translation key to be utilized based on determining one or more characteristics associated with the first CPRI information, in some implementations. For example, when mediation device 220 determines the first CPRI information to be a proprietary CPRI format associated with radio equipment controller 210, mediation device 220 may determine a translation key associated with translating the proprietary CPRI format to a generic CPRI format. Additionally, or alternatively, when mediation device 220 determines radio equipment device 230 to be an intended recipient of the first CPRI information associated with radio equipment controller 210, mediation device 220 may determine a translation key associated with translating the proprietary CPRI format (e.g., associated with radio equipment controller 210) to another proprietary CPRI format (e.g., associated with radio equipment device 230).

In some implementations, when mediation device 220 determines the first CPRI information to be a proprietary CPRI format associated with radio equipment device 230, mediation device 220 may determine a translation key associated with translating the proprietary CPRI format to a generic CPRI format. Additionally, or alternatively, when mediation device 220 determines radio equipment controller 210 to be an intended recipient of the first CPRI information associated with radio equipment device 230, mediation device 220 may determine a translation key associated with translating the proprietary CPRI format (e.g., associated with radio equipment device 230) to another proprietary CPRI format (e.g., associated with radio equipment controller 210).

Mediation device 220 may determine the translation key to be utilized based on determining one or more characteristics associated with a second CPRI format (e.g., an intended output CPRI format), in some implementations. For example, when mediation device 220 determines that second CPRI information is to be generated as a proprietary CPRI format associated with radio equipment controller 210, mediation device 220 may determine a translation key associated with translating generic CPRI information to a format associated with radio equipment controller 210. Additionally, or alternatively, when mediation device 220 determines that the second CPRI information is to be generated as another proprietary CPRI format associated with radio equipment device 230, mediation device 220 may determine a translation key associated with translating a generic CPRI format to another format associated with radio equipment device 230.

Mediation device 220 may receive input associated with determining the translation key, in some implementations. For example, mediation device 220 may receive information associated with the translation key when receiving information associated with the first CPRI information. In this case, an indication of the translation key that is to be associated with the first CPRI information may be provided by radio equipment controller 210, radio equipment device 230, a transmission device, or the like.

Additionally, or alternatively, mediation device 220 may receive input, associated with determining the translation key, via an input device (e.g., a keyboard, a keypad, etc.). For example, mediation device 220 may receive user input (e.g., a translation key identifier), and mediation device 220 may associate the user input with a particular translation key. In some implementations, mediation device 220 may determine the translation key based on accessing a data structure. For example, mediation device 220 may access a data structure (e.g., a local data structure, an external data structure, etc.) to determine the translation key based on receiving a particular translation key identifier.

As further shown in FIG. 4, process 400 may include generating second CPRI information associated with a second CPRI format based on processing the first CPRI information with the translation key (block 430). For example, mediation device 220 may generate the second CPRI information based on processing the first CPRI information with the translation key. In some implementations, mediation device 220 may generate the second CPRI information to be a different format from the first CPRI information. For example, when mediation device 220 determines the first CPRI information to be associated with a proprietary format, mediation device 220 may generate the second CPRI information to be associated with a generic format. Additionally, or alternatively, when mediation device 220 determines the first CPRI information to be associated with a generic format, mediation device 220 may generate the second CPRI information to be associated with a proprietary format. Additionally, or alternatively, when mediation device 220 determines the first CPRI information to be associated with a first proprietary CPRI format, mediation device 220 may generate the second CPRI information to be associated with a second proprietary CPRI format.

Mediation device 220 may generate a quantity of the second CPRI information based on receiving a threshold quantity of the first CPRI information. For example, mediation device 220 may generate the second CPRI information based on receiving a particular quantity of bits of the first CPRI information that satisfies the threshold. Additionally, or alternatively, mediation device 220 may generate the second CPRI information continuously based on receiving the first CPRI information.

Mediation device 220 may generate the second CPRI information to be associated with a recipient of the second CPRI information. For example, when the recipient of the second CPRI information is determined to be radio equipment controller 210, mediation device 220 may generate CPRI information of a particular proprietary format associated with radio equipment controller 210. Additionally, or alternatively, when the recipient of the second CPRI information is determined to be radio equipment device 230, mediation device 220 may generate CPRI information of another proprietary CPRI format associated with radio equipment device 210. Additionally, or alternatively, when the recipient of the second CPRI information is determined to be another mediation device 220, mediation device 220 may generate CPRI information of a generic CPRI format.

Mediation device 220 may determine one or more processing characteristics associated with processing the first CPRI information, in some implementations. For example, mediation device 220 may determine an encryption characteristic, a decryption characteristic, a compression characteristic, a decompression characteristic, or the like. In some implementations, mediation device 220 may determine the one or more characteristics based on accessing a data structure storing characteristics associated with processing the first CPRI information. For example, the data structure may include an indication of a technique, such as an encryption technique (e.g., an advanced encryption standard algorithm, etc.), a compression technique (e.g., a lookup table compression algorithm, etc.), or the like, to be applied. Additionally, or alternatively, the data structure may include an indication of another technique (e.g., a decryption technique, a decompression technique, etc.) to be applied when CPRI information of a generic CPRI format is received.

Mediation device 220 may, when processing the first CPRI information, generate the second CPRI information based on translating the first CPRI information, in some implementations. For example, mediation device 220 may translate the first CPRI information based on the translation key. Additionally, or alternatively, mediation device 220 may, when processing the first CPRI information, generate the second CPRI information based on the one or more processing characteristics. For example, mediation device 220 may process the first CPRI information, such as by encrypting the first CPRI information (e.g., based on determining an encryption characteristic), decrypting the first CPRI information (e.g., based on determining a decryption characteristic), compressing the first CPRI information (e.g., based on determining a compression characteristic), decompressing the first CPRI information (e.g., based on determining a decompression characteristic), or the like, to generate the second CPRI information.

As further shown in FIG. 4, process 400 may include providing information associated with the second CPRI information (block 440). For example, mediation device 220 may provide information associated with the second CPRI information. In some implementations, mediation device 220 may provide the second CPRI information to a recipient, such as radio equipment controller 210, radio equipment device 230, another mediation device 220, a transmission device, or the like, when providing information associated with the second CPRI information. Additionally, or alternatively, mediation device 220 may provide information regarding the second CPRI information, such as information identifying a translation characteristic, an encryption characteristic, a decryption characteristic, a compression characteristic, a decompression characteristic, or the like, when providing information associated with the second CPRI information. In some implementations, mediation device 220 may provide the information associated with the second CPRI information via a particular network path (e.g., associated with network 240) based on processing the first CPRI information (e.g., based on processing a routing tag, or the like, associated with the particular network path).

Mediation device 220 may provide information associated with the second CPRI information to multiple recipients, in some implementations. For example, when radio equipment controller 210 is intended to multicast the first CPRI information to multiple radio equipment devices 230, mediation device 220 may multicast the second CPRI information to the multiple radio equipment devices 230 and/or to one or more other mediation devices 220 associated with the multiple radio equipment devices 230.

In this way, a mediation device may translate between first CPRI information (e.g., proprietary CPRI information) and second CPRI information (e.g., generic CPRI information), thereby facilitating communication between a radio equipment controller configured to interpret a first proprietary CPRI format and a radio equipment device configured to interpret a second proprietary CPRI format.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
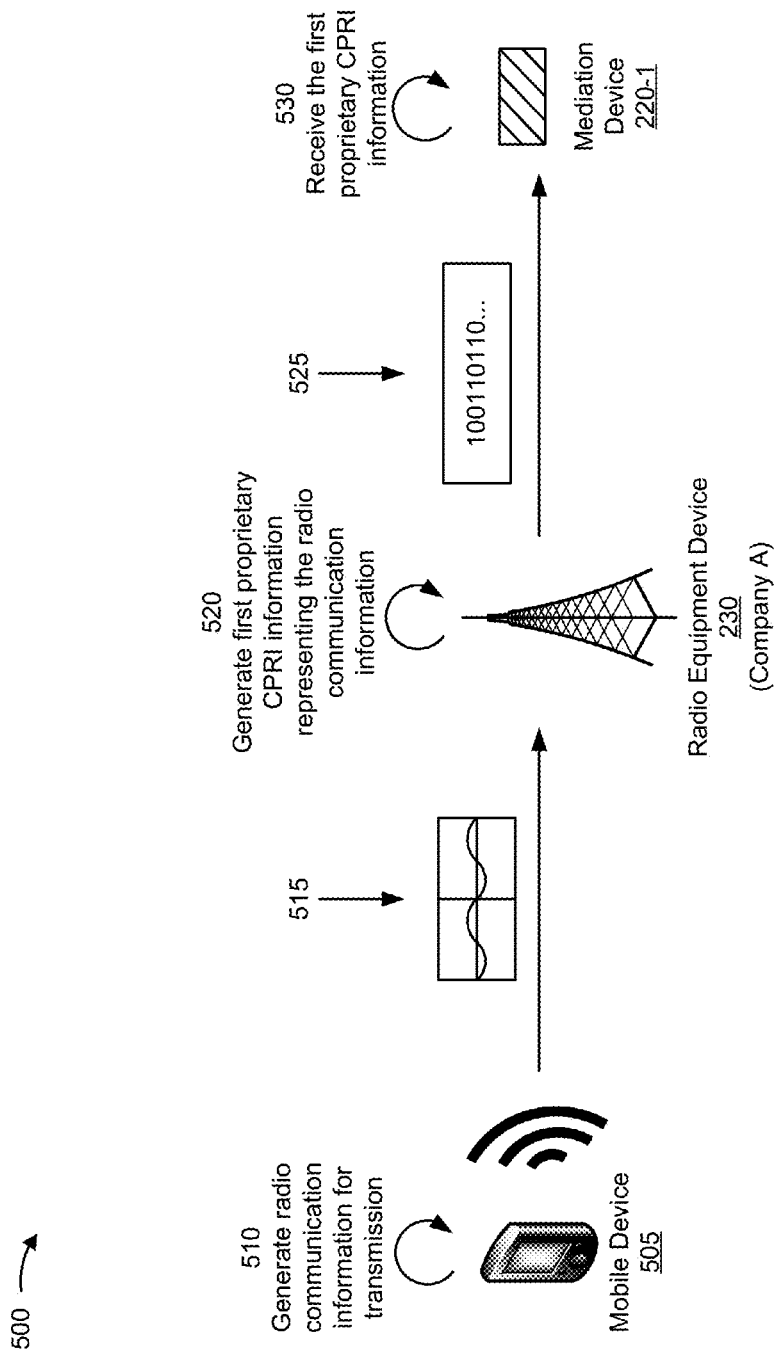
FIGS. 5A-5C are diagrams of an example implementation relating to the example process shown in FIG. 4.
Figure 5B:
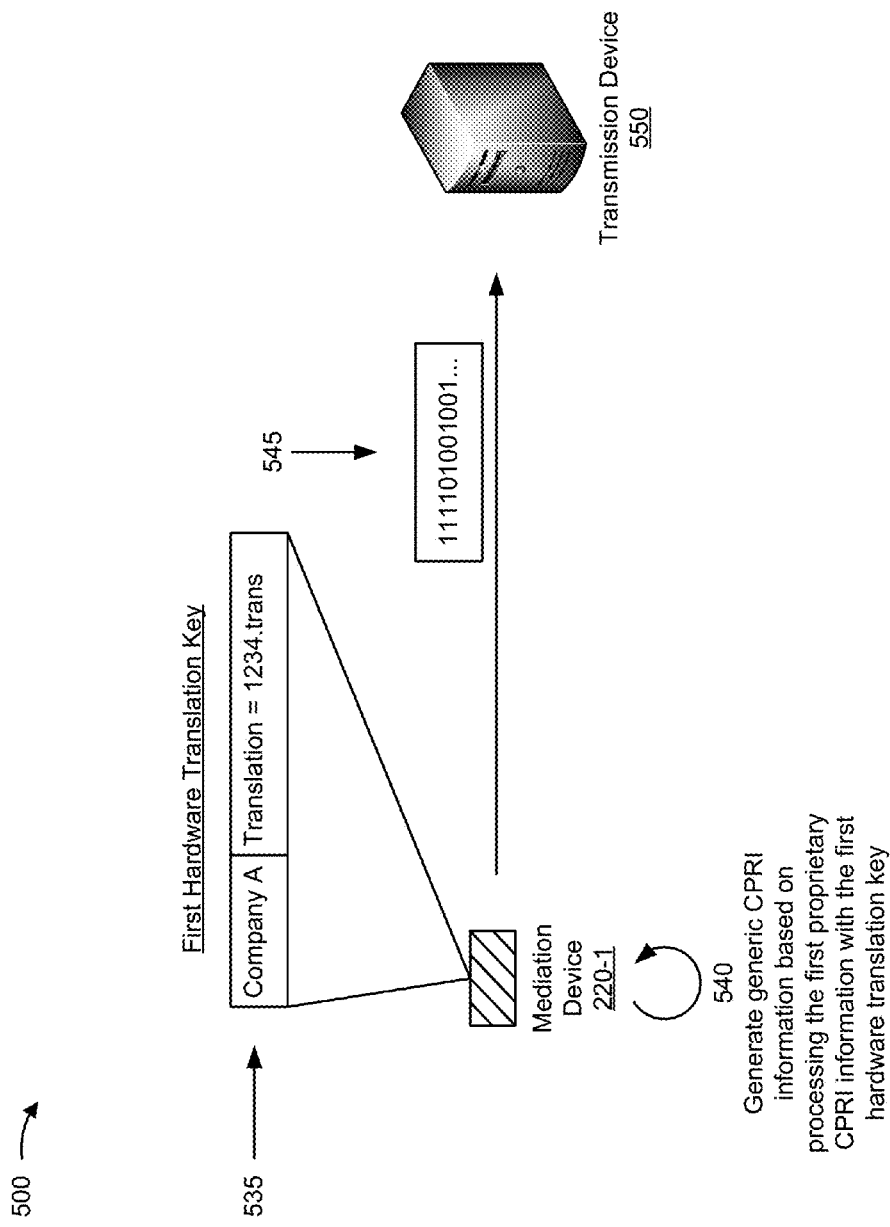
Figure 5C:
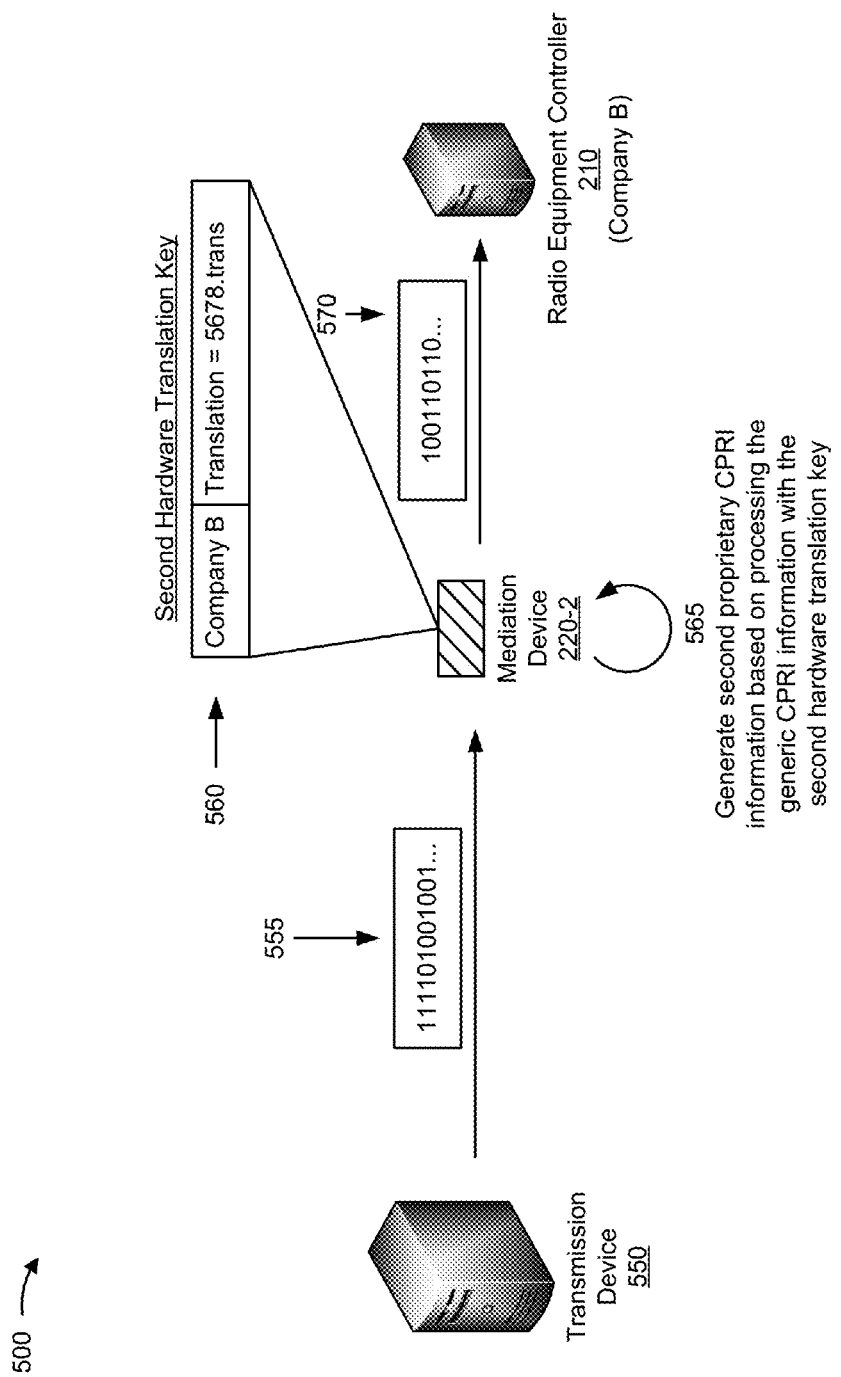

FIGS. 5A-5C are diagrams of an example implementation 500 relating to process 400 shown in FIG. 4. As shown in 5A, example implementation 500 includes mobile device 505, radio equipment device 230 (e.g., associated with a first vendor, "Company A"), and mediation device 220-1. As shown by reference number 510, mobile device 505 generates radio communication information for transmission. As shown by reference number 515, mobile device 505 transmits the radio communication information (e.g., via a waveform). As shown by reference number 520, radio equipment device 230 receives the radio communication information, and radio equipment device 230 generates first proprietary CPRI information associated with representing the radio communication information. Assume that the first proprietary CPRI information is of a first proprietary CPRI format interpretable by devices associated with Company A. As shown by reference number 525, radio equipment device 230 transmits the first proprietary CPRI information (e.g., a set of bits "100110110 . . . ") to mediation device 220-1 (e.g., via a dongle connection, via a network connection, etc.). As shown by reference number 530, mediation device 220-1 receives the first proprietary CPRI information.

As shown in FIG. 5B, and by reference number 535, mediation device 220-1 includes a first hardware translation key (e.g. including an encryption key associated with Company A, "1234.trans"). Assume that the first hardware translation key is associated with translating between the first proprietary CPRI format associated with Company A and a generic CPRI format. As shown by reference number 540, mediation device 220-1 generates generic CPRI information (e.g., associated with the generic CPRI format) based on processing the first proprietary CPRI information with the hardware translation key. As shown by reference number 545, mediation device 220-1 provides the generic CPRI information (e.g., "111101001001. . . ") to transmission device 550 (e.g., a device associated with routing CPRI information).

As shown in FIG. 5C, and by reference number 555, transmission device 550 routes the generic CPRI information to mediation device 220-2. As shown by reference number 560, mediation device 220-2 includes a second hardware translation key (e.g., including an encryption key associated with a second vendor, "Company B," "5678.trans"). Assume that the second hardware translation key is associated with translating between the generic CPRI format and a second proprietary CPRI format interpretable by radio equipment controller 210 (e.g., associated with Company B). As shown by reference number 565, mediation device 220-2 generates second proprietary CPRI information (e.g., associated with the second proprietary CPRI format) based on processing the generic CPRI information with the second hardware translation key. As shown by reference number 570, mediation device 220-2 provides the second proprietary CPRI information (e.g., "100110110 . . . ") to radio equipment controller 210. Radio equipment controller 210 may interpret the second proprietary CPRI information to further process the radio communication information.

As indicated above, FIGS. 5A-5C are provided merely as an example. Other examples are possible and may differ from what was described with regard to FIGS. 5A-5C.

Figure 6A:
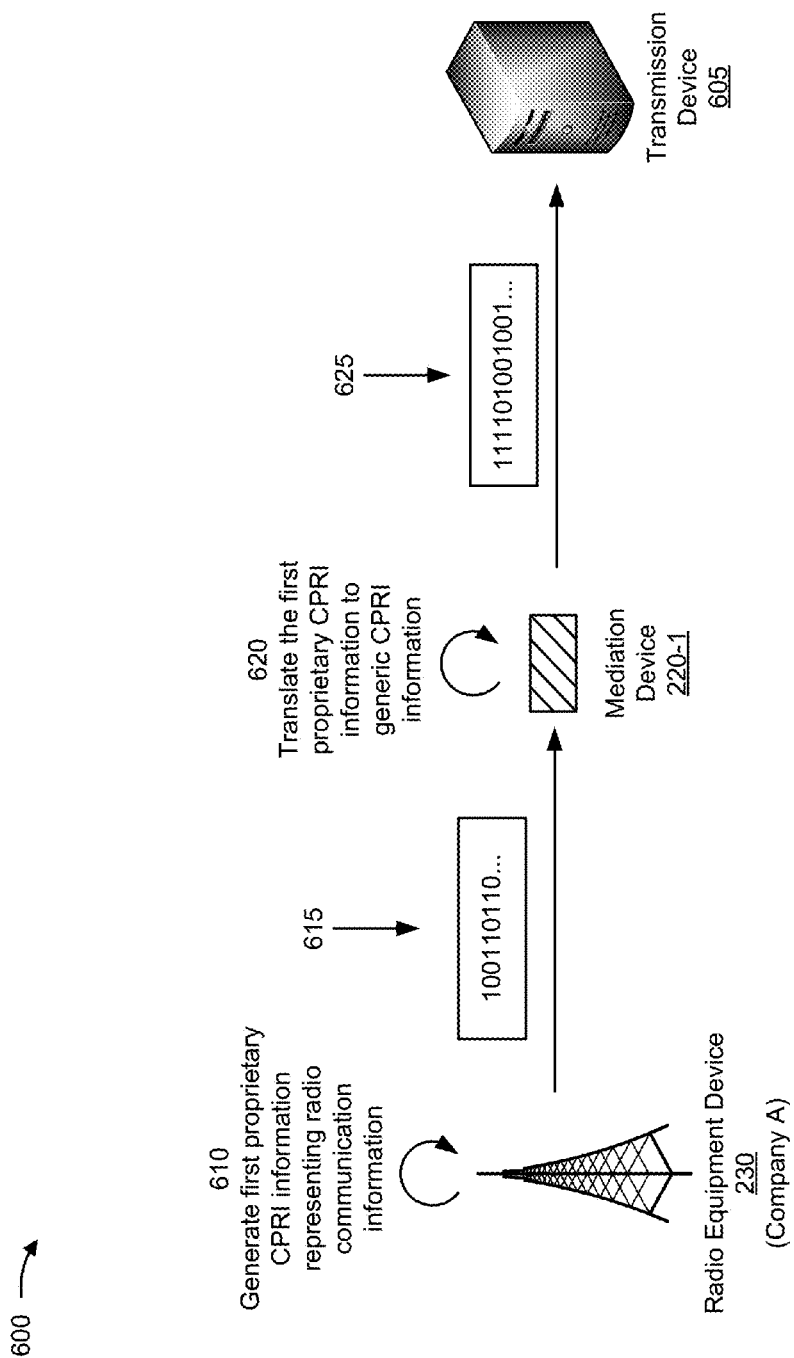

FIGS. 6A-6D are diagrams of an example implementation 600 relating to process 400 shown in FIG. 4. As shown in FIG. 6A, example implementation 600 includes radio equipment device 230 (e.g., associated with a first vendor, "Company A"), mediation device 220-1, and transmission device 605

(e.g., a device associated with routing CPRI information). Assume that radio equipment device 230 receives radio communication information (e.g., from a mobile device via network 240). As shown by reference number 610, radio equipment device 230 generates first proprietary CPRI information (e.g., in a first proprietary CPRI format associated with Company A) representing the radio communication information. As shown by reference number 615, radio equipment device 230 provides the first proprietary CPRI information (e.g., "100110110 . . . ") to mediation device 220-1. As shown by reference number 620, mediation device 220-1 receives the first proprietary CPRI information, and translates (e.g., utilizing a translation key) the first proprietary CPRI information to generic CPRI information (e.g., information of a generic CPRI format). As shown by reference number 625, mediation device 220-1 provides the generic CPRI information (e.g., "111101001001 . . . ") to transmission device 605.

Figure 6B:
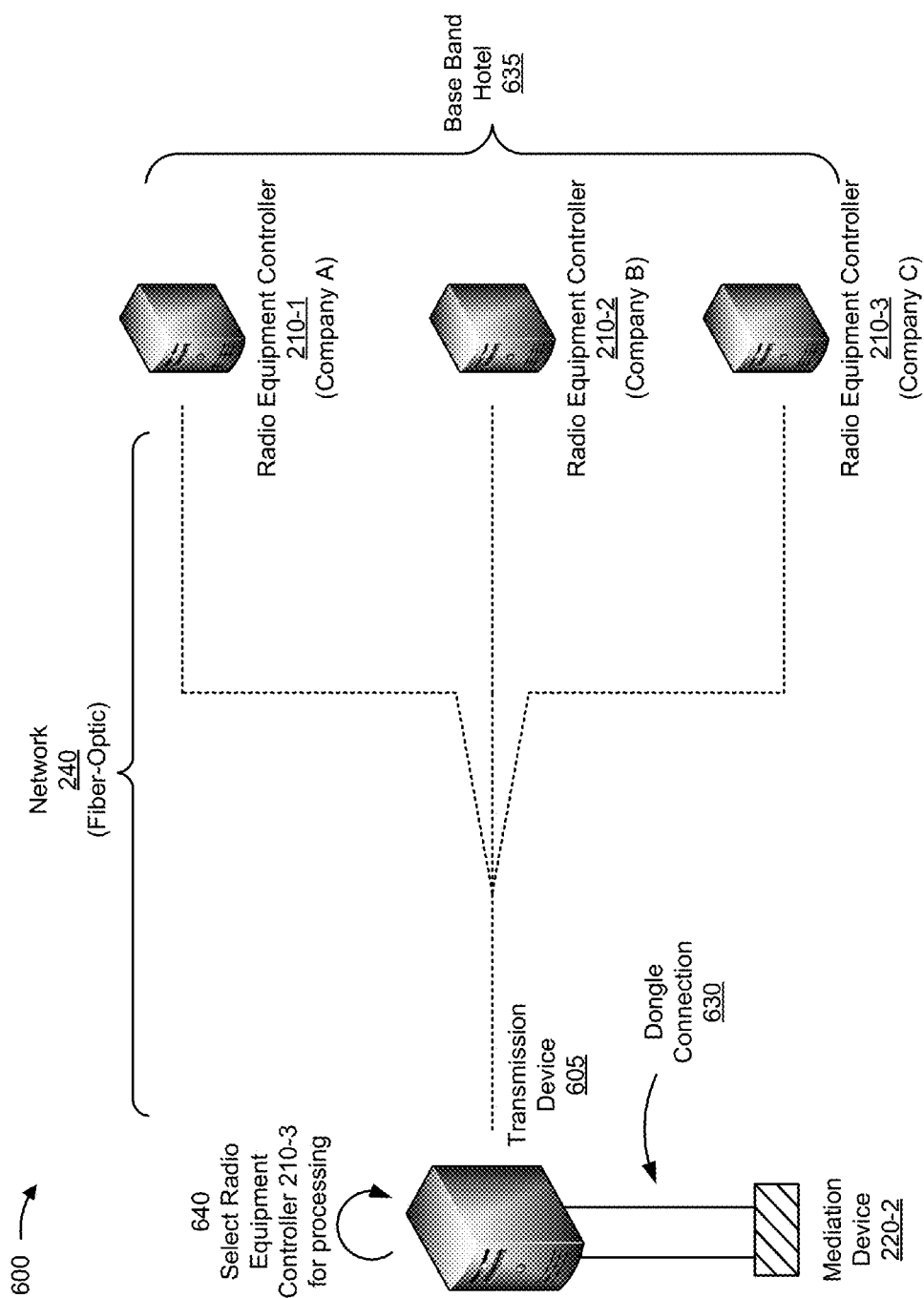

As shown in FIG. 6B, transmission device 605 is configured with dongle connection 630 to mediation device 220-2. Transmission device 605 is further configured to connect via network 240 (e.g., a fiber-optic network) to base band hotel 635. Assume that base band hotel 635 includes radio equipment controller 210-1 (e.g., associated with the first vendor, Company A), radio equipment controller 210-2 (e.g., associated with a second vendor, "Company B"), and radio equipment controller 210-3 (e.g., associated with a third vendor, "Company C"). As shown by reference number 640, assume that transmission device 605 selects radio equipment controller 210-3 for processing of the radio communication information.

As shown in FIG. 6C, and by reference number 645, transmission device 605 determines to provide the generic CPRI information and routing information associated with the generic CPRI information to mediation device 220-2 (e.g., via dongle connection 630). As shown by reference number 650, the generic CPRI information (e.g., "111101001001 . . . ") is received by mediation device 220-2. As shown by reference number 655, the routing information is received by mediation device 220-2 (e.g., an indication that the generic CPRI information is intended to be provided to "Radio Equipment Controller 210-3"). As shown by reference number 660, mediation device 220-2 includes a translation key table storing translation keys associated with Company A (e.g., "1234.trans"), Company B (e.g., "5678.trans"), and Company C (e.g., "9101.trans"). As shown by reference number 665, mediation device 220-2 selects translation key 9101.trans from the translation key table based on the routing information.

Figure 6D:
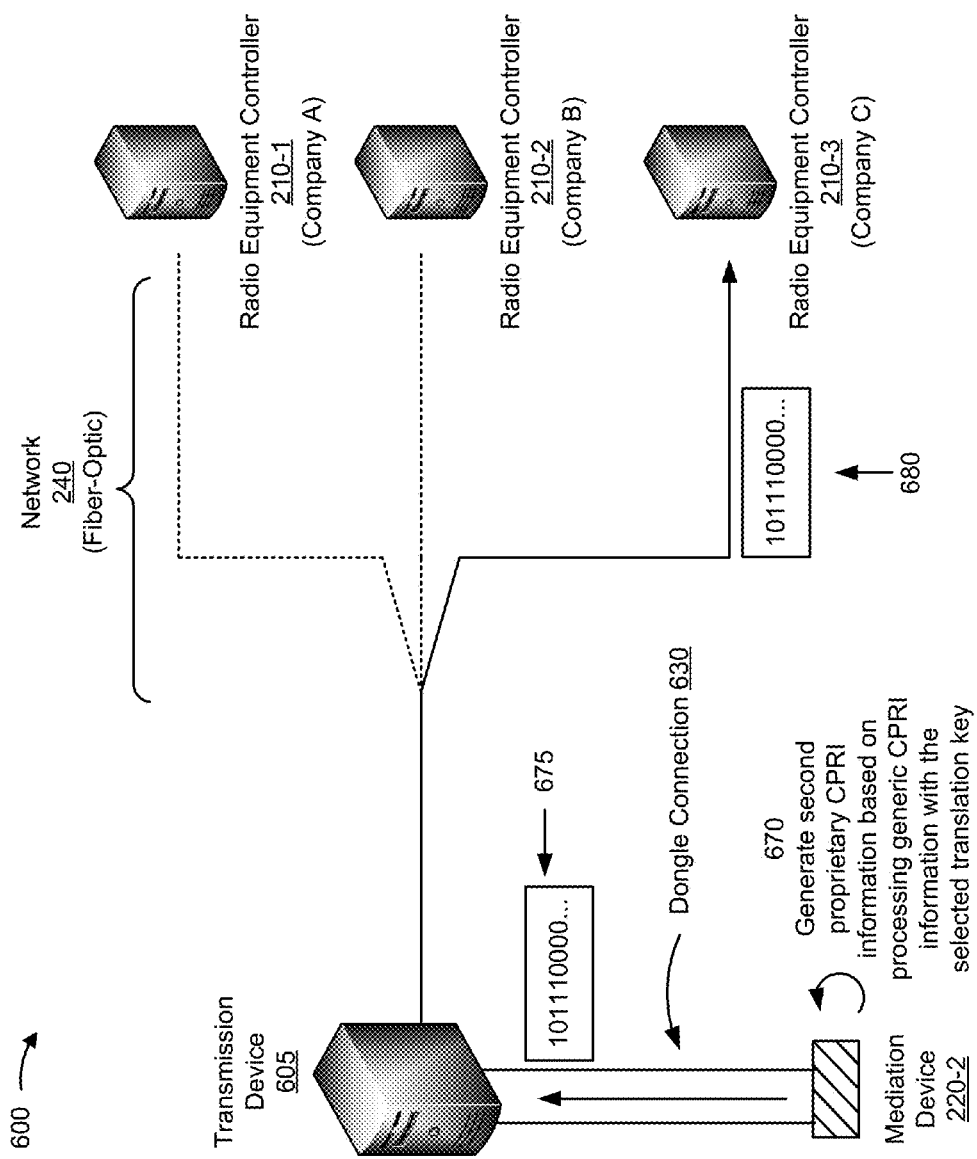

As shown in FIG. 6D, and by reference number 670, mediation device 220-2 processes the generic CPRI information with translation key 9101.trans to generate second proprietary CPRI information (e.g., a second proprietary CPRI format that is interpretable by radio equipment controller 210-3). As shown by reference number 675, mediation device 220-2 provides the second proprietary CPRI information (e.g., "101110000. . . ") to transmission device 605 (e.g., via dongle connection 630). As shown by reference number 680, transmission device 605 provides the second proprietary CPRI information to radio equipment controller 210-3 (e.g., via network 240). Radio equipment controller 210-3 receives the second proprietary CPRI information and, may interpret the second proprietary CPRI information to further process the radio communication information.

As indicated above, FIGS. 6A-6D are provided merely as an example. Other examples are possible and may differ from what was described with regard to FIGS. 6A-6D.

Implementations described herein may assist a mediation device in processing first proprietary CPRI information with a translation key to generate generic CPRI information. Furthermore, another mediation device may process the generic CPRI information to generate second proprietary CPRI information, thereby facilitating communication between a radio equipment controller configured to utilize a first format associated with the first proprietary CPRI information and a radio equipment device configured to utilize a second format associated with the second proprietary CPRI information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Similarly, as used herein, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors, implemented at least partially in hardware, to:
receive information associated with a proprietary common public radio interface (CPRI) format,
the information being proprietary CPRI information associated with a particular set of devices;
determine a translation key associated with the proprietary CPRI information based on receiving the information associated with the proprietary CPRI information,
the translation key including information associated with translating the proprietary CPRI information to generic CPRI information;
determine that a quantity of received bits satisfies a bit threshold,
the bit threshold being associated with characterizing a particular amplitude and phase associated with a waveform, and
the quantity of received bits being associated with the proprietary CPRI information; and
process, based on determining that the quantity of received bits satisfies the bit threshold, the proprietary CPRI information with the translation key to generate the generic CPRI information,
the generic CPRI information being a different format from the proprietary CPRI information; and
provide information associated with the generic CPRI information.

2. The device of claim 1, where the proprietary CPRI information is first proprietary CPRI information; and
where the one or more processors, when providing information associated with the generic CPRI information, are to:
convert the generic CPRI information to second proprietary CPRI information for transmission to a particular device,
the second proprietary CPRI information being a different format from the first proprietary CPRI information and being a different format from the generic CPRI information.

3. The device of claim 1, where the one or more processors, when receiving the information associated with the proprietary CPRI information, are to:
receive the information associated with the proprietary CPRI information from a radio equipment device,
the radio equipment device being associated with a particular vendor; and
where the one or more processors, when determining the translation key associated with the proprietary CPRI information, are to:
identify a translation key associated with the particular vendor.

4. The device of claim 1, where the one or more processors, when determining the translation key associated with the proprietary CPRI information, are to:
identify a characteristic associated with the proprietary CPRI information; and
retrieve a software encryption key associated with the identified characteristic from a data structure storing a set of software encryption keys.

5. The device of claim 1, where the one or more processors, when determining the translation key associated with the proprietary CPRI information, are to:
receive a CPRI format identifier associated with the proprietary CPRI information; and
determine the translation key based on receiving the CPRI format identifier associated with the proprietary CPRI information.

6. The device of claim 1, where the one or more processors are further to:
determine an encryption technique associated with the generic CPRI information; and
where the one or more processors, when generating the generic CPRI information, are to:
apply the encryption technique associated with the generic CPRI information to the proprietary CPRI information to generate the generic CPRI information.

7. The device of claim 1, where the one or more processors are further to:
identify a hardware encryption key associated with the proprietary CPRI format,
the hardware encryption key including information associated with processing the proprietary CPRI information to generate the generic CPRI information; and
where the one or more processors, when determining the translation key associated with the proprietary CPRI information, are to:
determine the translation key based on identifying the hardware encryption key.

8. A method comprising:
receiving, by a device, first common public radio interface (CPRI) information associated with a first CPRI format;
determining, by the device, a translation key associated with the first CPRI format,
the translation key including information associated with translating the first CPRI information to a second CPRI format,
the second CPRI format being different from the first CPRI format;
determining, by the device, that a quantity of received bits satisfies a bit threshold,
the bit threshold being associated with characterizing a particular amplitude and phase associated with a waveform, and
the quantity of received bits being associated with the first CPRI information;
processing, by the device and based on determining that the quantity of received bits satisfies the bit threshold, the first CPRI information with the translation key;
generating, by the device, second CPRI information based on processing the first CPRI information with the translation key,
the second CPRI information being associated with the second CPRI format; and
providing, by the device, the second CPRI information associated with the second CPRI format.

9. The method of claim 8, where the first CPRI format is a proprietary CPRI format, the method further comprising:
receiving information identifying a characteristic associated with the first CPRI format; and
where determining the translation key comprises:
determining the translation key based on identifying the characteristic associated with the first CPRI format.

10. The method of claim 8, further comprising:
determining the second CPRI format to be a particular proprietary CPRI format;
receiving information identifying a characteristic associated with the particular proprietary CPRI format; and where determining the translation key comprises:
  determining the translation key based on identifying the characteristic associated with the particular proprietary CPRI format.

11. The method of claim 8, where generating the second CPRI information based on processing the first CPRI information with the translation key, comprises:
  identifying a first set of bits of the first CPRI information,
    the first set of bits being associated with the first CPRI format; and
  processing the first set of bits with the translation key to generate a second set of bits,
    the second set of bits being associated with the second CPRI format.

12. The method of claim 8, further comprising:
  determining an encryption technique; and
  where generating the second CPRI information based on processing the first CPRI information with the translation key, comprises:
    applying the encryption technique to the first CPRI information.

13. The method of claim 8, further comprising:
  identifying one or more hardware encryption keys associated with translating between CPRI formats,
    the one or more hardware encryption keys including a particular hardware encryption key associated with translating between the first CPRI format and the second CPRI format; and
  where determining the translation key associated with the first CPRI format comprises:
    selecting the particular hardware encryption key, from the one or more hardware encryption keys, associated with translating between the first CPRI format and the second CPRI format.

14. A computer-readable medium storing instructions, the instructions comprising:
  one or more instructions that, when executed by one or more processors, cause the one or more processors to:
    receive information associated with a proprietary common public radio interface (CPRI) format,
      the information being proprietary CPRI information associated with a particular set of devices;
    determine a translation key associated with the proprietary CPRI information based on receiving the information associated with the proprietary CPRI information,
      the translation key including information associated with translating the proprietary CPRI information to generic CPRI information;
    determine that a quantity of received bits satisfies a bit threshold,
      the bit threshold being associated with characterizing a particular amplitude and phase associated with a waveform, and
      the quantity of received bits being associated with the proprietary CPRI information;
    process, based on determining that the quantity of received bits satisfies the bit threshold, the proprietary CPRI information with the translation key to generate the generic CPRI information,
      the generic CPRI information being a different format from the proprietary CPRI information; and
    provide information associated with the generic CPRI information.

15. The computer-readable medium of claim 14, where the proprietary CPRI information is first proprietary CPRI information; and
  where the one or more instructions, that cause the one or more processors to provide information associated with the generic CPRI information, cause the one or more processors to:
    convert the generic CPRI information to second proprietary CPRI information for transmission to a particular device,
      the second proprietary CPRI information being a different format from the first proprietary CPRI information and being a different format from the generic CPRI information.

16. The computer-readable medium of claim 14, where the one or more instructions, that cause the one or more processors to receive the information associated with the proprietary CPRI information, cause the one or more processors to:
  receive the information associated with the proprietary CPRI information from a radio equipment device,
    the radio equipment device being associated with a particular vendor; and
  where the one or more instructions, that cause the one or more processors to determine the translation key associated with the proprietary CPRI information, cause the one or more processors to:
    identify a translation key associated with the particular vendor.

17. The computer-readable medium of claim 14, where the one or more instructions, that cause the one or more processors to determine the translation key associated with the proprietary CPRI information, further cause the one or more processors to:
  identify a characteristic associated with the proprietary CPRI information; and
  retrieve a software encryption key associated with the identified characteristic from a data structure storing a set of software encryption keys.

18. The computer-readable medium of claim 14, where the one or more instructions, that cause the one or more processors to determine the translation key associated with the proprietary CPRI information, further cause the one or more processors to:
  receive a CPRI format identifier associated with the proprietary CPRI information; and
  determine the translation key based on receiving the CPRI format identifier associated with the proprietary CPRI information.

19. The computer-readable medium of claim 14, where the one or more instructions, when executed by the one or more processors, further cause the one or more processors to:
  determine an encryption technique associated with the generic CPRI information; and
  where the one or more processors, when generating the generic CPRI information, are to:
    apply the encryption technique associated with the generic CPRI information to the proprietary CPRI information to generate the generic CPRI information.

20. The computer-readable medium of claim 14, where the one or more instructions, when executed by the one or more processors, further cause the one or more processors to:
  identify a hardware encryption key associated with the proprietary CPRI format,
    the hardware encryption key including information associated with processing the proprietary CPRI information to generate the generic CPRI information; and where the one or more processors, when determining the translation key associated with the proprietary CPRI information, are to:
determine the translation key based on identifying the hardware encryption key.

* * * * *